United States Patent [19]

Smucker et al.

[11] Patent Number: 5,052,340
[45] Date of Patent: Oct. 1, 1991

[54] CHITIN BASED DIET FOR BIVALVES

[75] Inventors: Richard A. Smucker, Lusby; Myron E. Taylor, Brookeville, both of Md.

[73] Assignee: ATP, Ltd., Lusby, Md.

[21] Appl. No.: 512,189

[22] Filed: Apr. 20, 1990

[51] Int. Cl.$^5$ ............................................. A01K 61/00
[52] U.S. Cl. ........................................................ 119/4
[58] Field of Search ......................... 119/4; 426/2, 643

[56] References Cited

U.S. PATENT DOCUMENTS

| | | | |
|---|---|---|---|
| 1,933,950 | 11/1933 | Wells | 119/4 |
| 3,196,833 | 7/1965 | Glancy | 119/4 |
| 3,264,116 | 8/1966 | Gray | 426/643 X |
| 3,298,354 | 1/1967 | Geer, Jr. | 119/4 |
| 3,592,168 | 7/1971 | Claus | 119/4 |
| 3,733,204 | 5/1973 | Campbell | 426/2 |
| 3,870,020 | 3/1975 | Hunt | 119/4 |
| 4,073,946 | 2/1978 | Bayless | 426/2 |
| 4,080,930 | 3/1978 | Pruder et al. | 119/4 |
| 4,449,480 | 5/1984 | Ison et al. | 119/4 |
| 4,820,529 | 4/1989 | Uchida et al. | 426/643 X |

OTHER PUBLICATIONS

Smucker and Wright (Comp. Biochem. Physiol., 77A: 239 & 241, 1984).
Mayasich and Smucker (Microb. Ecol. 14:157–166, 1987).

*Primary Examiner*—Robert P. Swiatek
*Assistant Examiner*—Todd E. Manahan
*Attorney, Agent, or Firm*—Roylance, Abrams, Berdo & Goodman

[57] ABSTRACT

A method of feeding bivalves comprises periodically adding comminuted chitin-containing material having particles smaller than 40 μm to a body of water containing bivalves. Arthropod exoskeletons, and particularly, crab shells, are a relatively inexpensive and readily obtainable chitin-containing material that can be comminuted and used for feeding bivalves.

28 Claims, No Drawings

CHITIN BASED DIET FOR BIVALVES

BACKGROUND OF THE INVENTION

1 Field of the Invention

The present invention relates to a method of feeding bivalves. In particular, this invention relates to an arthropod chitin-based diet for bivalves.

2. Description of Related Art

Bivalves in their native environment rely on suspended organic particles including phytoplankton and organic debris for their food. It is known that bivalves have digestive enzymes for digesting protein, lipids, carbohydrates and other food material found in their environment. It has recently been discovered that bivalves also possess enzymes such as chitinase and chitobiase, giving them a high capacity for digesting chitin, a polysaccharide found in phytoplankton, fungi, and many invertebrates. The basic monomer unit of chitin, N-acetyl-D-flucosamine (GlcNAc) is a substance capable of supplying acetate and glucose for energy metabolism and compound synthesis and can be used as a source of amino nitrogen. Moreover, GlcNAc is a key component in the biosynthesis of the organic phase of shell and gill arch development. Thus, chitin may be especially valuable during the early life and juvenile stages of bivalves.

The use of comminuted chitin-containing material periodically added to a body of water as a feed for bivalves and particularly, the use of comminuted arthropod exoskeletons has not been previously reported.

R. A. Smucker and D. A. Wright, Comp. Biochem. Physiol. A., 77A: 239–241 discuss an experiment for determining the presence and activity of chitinase in *Crassostrea virginica* wherein adult oysters were treated with purified, regenerated chitin (prepared by reacetylation of chitosan) for a period of 72 hours after which the styles were removed and analyzed for chitinase activity and protein content. The study concluded that chitinase is an integral component of the oyster digestive system, allowing oysters to make use of the chitin present in their natural diet.

Mayasich, S. A. and R. A. Smucker, Microb. Ecol. 14: 157–166 (1987) discuss an experiment wherein oysters were treated with colloidal, regenerated chitin for a 24 hour period after which their styles were removed and analyzed.

U.S. Pat. No. 3,298,354 to Geer discloses a method of enhancing the growth of the shells of bivalve larvae by mixing into their water a dust made from the shell of the particular bivalve.

U.S. Pat. No. 3,592,168 to Claus discloses a method of feeding bivalves separated blood cells. The patent discloses that the ideal size range for bivalve foods is from 4 to 20 micron diameter.

U.S. Pat. No. 4,080,930 to Pruder et al. discloses a method of growing marine bivalves including feeding them a diet of algae.

U.S. Pat. No. 3,196,833 to Glancy discloses a method of producing shellfish seed in a contaminant free and nutrient including environment.

U.S. Pat. No. 3,870,020 to Hunt discloses a method of growing oysters in a controlled environment with the diatom *Cyclotella nana* used as the food source for the oysters.

U.S. Pat. No. 1,933,950 to Wells discloses a method of shellfish culture including centrifuging the culture water to remove bodies larger than the shellfish.

U.S. Pat. No. 4,449,480 to Ison et al. discloses a method of transforming glochidia larvae of freshwater mussels to the juvenile stage that includes feeding the larvae a complex artificial growth medium containing antibiotics, antimycotics, inorganic salts, amino acids, vitamins, and other compounds including glucose.

Current methods commonly used for feeding bivalves include raising the bivalves in an environment of natural, filtered or centrifuged sea water, alone or with the addition of phytoplankton or concentrated formulated foods containing protein, fat and carbohydrates. The disadvantages of the use of phytoplankton and formulated foods include their great expense. It has been calculated that phytoplankton production costs represent more than 30% of juvenile oyster production costs. Phytoplankton production is keyed to natural seasonal cycles and is limited primarily by insolation and temperature.

SUMMARY OF THE INVENTION

The primary object of this invention is to provide a method of feeding bivalves using relatively inexpensive and easily obtainable material that is digestible by bivalves.

The foregoing object is basically attained by providing a method of feeding bivalves comprising periodically adding comminuted chitin-containing material, other than shells of the particular bivalve being fed, having particles smaller than 40 μm, to a body of water containing bivalves.

The foregoing object is further attained by providing a method of feeding bivalves comprising adding comminuted arthropod exoskeletons having particles smaller than 40 μm to a body of water containing bivalves.

DETAILED DESCRIPTION OF THE INVENTION

The term "bivalves" as used herein includes any mollusks of the class Lamellibranchiata, also called Bivalvia, including, for example, oysters, clams, mussels and scallops, and includes any life stages of such animals from larvae and juvenile stages through adulthood. The term includes cultchless oysters.

Chitin is a polysaccharide made up of units of N-acetyl-D-glucosamine joined in $\beta$ (1→4) linkage. This linear molecule is arranged in the alpha form (antiparallel), the beta form (parallel) or a combination of the alpha and beta forms (the gamma configuration). The alpha molecular arrangement ($\alpha$-chitin) is found in arthropod exoskeletons and certain fungi; the beta molecular arrangement ($\beta$-chitin) is found in phytoplankton and the internal skeletons of cephalopods.

For the method of this invention, it is not necessary that purified chitin be used; rather, any material containing more than an incidental amount of chitin and not containing harmful compounds may be used. The term "chitin-containing material" as used herein does not include bivalve shells, particularly the shells of the particular bivalve being fed. Such material, though it contains an incidental amount of chitin, has a primarily calcium or mineral content.

Because of its inexpensiveness and availability, the preferred chitin-containing material is arthropod exoskeletons, particularly crab shells. Crab shells contain protein and lipids in addition to chitin and have potential as a high value food for bivalves. Further, crab shells are commonly treated as a waste and are therefore inexpensive and readily available.

Because bivalves swallow their food whole, food for bivalves must be of a small size. According to the method of this invention, chitin-containing material is comminuted to provide particles smaller than 40 μm and preferably smaller than 20 μm. The particular particle size desired will depend on the size and life stage of the particular bivalves to be fed; generally larvae require smaller food particles than do juveniles or adults.

Comminution of the chitin-containing material is achieved by processing the material through a unit such as a high-shear fluid homogenizer, a centrifugal mill, a Schutz-O'Neil Air-Swept Pulverizer, or a fluid-energy mill. Each of these methods produces particles of a size range suitable for bivalve feeding. The fluid-energy mill is preferred because it is the most effective, providing the highest percentage of particles smaller than 40 μm and producing many particles in the 1-10 μm range. These physical methods of producing fine particles can be augmented by or replaced by chemical methods including but not limited by mineral acid, organic acid, heat or enzymatic size reduction.

The term "comminuted chitin-containing material" refers to chitin-containing material that in its original or pre-comminution state is not made up of particles smaller than 40 μm and which is then comminuted according to one or more of the methods described above to provide such particles. Thus, the term "comminuted chitin-containing material" excludes organisms such as phytoplankton or yeast that are already of a small size to be eaten whole by bivalves and are not comminuted before being fed to bivalves. The term also excludes regenerated chitin, which is a material that is synthesized from chitosan (poly-glucosamine) by reacetylation and which is not comminuted. The above materials have the disadvantage of greater cost and limited availability in comparison to material such as arthropod exoskeletons, which is easily and cheaply obtained and which can be readily comminuted to the proper size for feeding to bivalves.

Bivalves are fed according to the method of this invention by adding the comminuted chitin-containing material to a body of water containing the bivalves. Since bivalves are normally grown a period of weeks, months or years, the comminuted chitin-containing material is preferably added to the body of water periodically. As used herein, the term "periodically" is used to mean intermittently or from time to time or as required, and is not meant to require that the feeding of bivalves must take place at definite regular intervals. The term also excludes short term experimental feeding of oysters, for example, for 72 hours or less. The chitin-containing material is added to the body of water for a period exceeding 72 hours and preferably over a period of time sufficient to grow bivalves to commercial maturity. Commercial maturity is that stage at which the bivalves may be harvested for sale.

Although the method of feeding bivalves described herein may be used to feed bivalves in any body of water, including the open sea, it is to be expected that the most efficient and preferred use of the method will be in connection with bivalves grown in aquaculture systems such as tanks or raceways that provide a sheltered and controlled environment for bivalves. Commonly, tanks for growing bivalves include means for water circulation so that food material added to the tank circulates and reaches the bivalves growing therein.

The chitin-containing material may be used alone or in connection with other organic or inorganic supplements or additives, which may be added to the chitin-containing material before or after the comminution step.

The amount of comminuted chitin-containing material to be added to the body of water depends on such factors as the type, size, life stage, feeding behavior and physiological condition of the particular bivalves, the temperature of the water, the amount of food available in the ambient water and the amount of other additives or supplements used.

The exact amount of chitin-containing material added to the body of water is not crucial, and the determination of a suitable concentration of chitin-containing material for feeding particular bivalves under particular conditions may be readily made by those skilled in the art.

The following example illustrates the use of the method of this invention under experimental conditions.

EXAMPLE

Partially deproteinized and decalcified powdered arthropod (crab) chitin was obtained in a dry form from a commercial supplier and comminuted to provide particles smaller than 40 μm.

Control and experimental sets of *Crassostrea virginica* were taken from natural stock. Fouling organisms were removed by mechanical cleaning and fresh water rinsing, followed by exposure to air and a second fresh water rinse. Animals were individually referenced by shell markings and scored for shell growth. The control and experimental sets were each placed in flow-through boxes. The control set received ambient sea water (20° C., 10 ppt); the experimental set received ambient sea water plus comminuted chitin. Dry comminuted chitin was added to the experimental tank in an aqueous suspension to yield a final concentration of 5 mg/liter of sea water. Additional comminuted chitin was periodically added every half day to maintain this concentration. (This is not necessarily the optimal concentration for growth yield.)

Growth was determined by monitoring changes in shell length. It was discovered that after 10 days, the experimental set had grown 25% more than the control set.

Although the invention has been described in considerable detail with specific reference to certain advantageous embodiments thereof, variations and modifications can be made without departing from the scope of the invention as described in the specification and defined in the appended claims.

What is claimed is:

1. A method of feeding bivalves comprising periodically adding comminuted chitin-containing material, other than shells of the particular bivalve being fed, said chitin-containing material having particles smaller than 40 μm and wherein the chitin in said chitin-containing material is in its natural chemical state, to a body of water containing bivalves whereby the chitin in said chitin-containing material is digested by said bivalves.

2. The method according to claim 1, wherein said chitin-containing material is arthropod exoskeletons.

3. The method according to claim 1, wherein said chitin-containing material is crab shells.

4. The method according to claim 1, wherein said chitin-containing material is deproteinized and decalcified powdered arthropod chitin.

5. The method according to claim 1, wherein said chitin-containing material is cephalopod skeletons.

6. The method according to claim 1, wherein said bivalves are oysters.

7. The method according to claim 1, wherein said bivalves are oyster larvae.

8. The method according to claim 1, wherein said bivalves are oyster juveniles.

9. The method according to claim 1, wherein said bivalves are oyster adults.

10. The method according to claim 1, wherein said bivalves are cultchless oysters.

11. A method of feeding and growing bivalves to commercial maturity comprising periodically adding comminuted $\alpha$-chitin-containing material, other than shells of the particular bivalve being fed, said $\alpha$-chitin-containing material having particles smaller than 40 82 m and wherein the chitin in said $\alpha$-chitin-containing material is in its natural chemical state, to a body of water containing bivalves whereby the chitin in said $\alpha$-chitin-containing material is digested by said bivalves.

12. The method according to claim 11, wherein said $\alpha$-chitin-containing material is arthropod exoskeletons.

13. The method according to claim 11, wherein said $\alpha$-chitin-containing material is crab shells.

14. The method according to claim 11, wherein said $\alpha$-chitin-containing material is deproteinized and decalcified powdered arthropod chitin.

15. The method according to claim 11, wherein said bivalves are oysters.

16. The method according to claim 11, wherein said bivalves are oyster larvae.

17. The method according to claim 11, wherein said bivalves are oyster juveniles.

18. The method according to claim 11, wherein said bivalves are oyster adults.

19. The method according to claim 11, wherein said bivalves are cultchless oysters.

20. A method of feeding bivalves comprising adding comminuted arthroped exoskeletons having particles smaller than 40 $\mu$m and containing chitin in its natural chemical state to a body of water containing bivalves whereby said chitin is digested by said bivalves.

21. The method according to claim 20, wherein said arthropod exoskeletons are crab shells.

22. The method according to claim 20, wherein said bivalves are oysters.

23. The method according to claim 20, wherein said bivalves are oyster larvae.

24. The method according to claim 20, wherein said bivalves are oyster juveniles.

25. The method according to claim 20, wherein said bivalves are oyster adults.

26. The method according to claim 20, wherein said bivalves are cultchless oysters.

27. The method according to claim 20, wherein said adding of comminuted arthropod exoskeletons includes adding comminuted arthropod exoskeletons having particles smaller than 20 $\mu$m.

28. The method according to claim 20, wherein step of adding comminuted arthropod exoskeletons is repeated periodically.

* * * * *